United States Patent
Ocone

[15] 3,675,699
[45] July 11, 1972

[54] WHEEL ASSEMBLY WITH TIRE COOLING MEANS

[72] Inventor: Luke Ralph Ocone, Philadelphia, Pa.
[73] Assignee: Pennwalt Corporation
[22] Filed: Feb. 27, 1970
[21] Appl. No.: 15,172

[52] U.S. Cl. .................................. 152/153, 152/330 W
[51] Int. Cl. ............................................... B60b 19/06
[58] Field of Search .................. 152/153, 330 W; 301/6 CS

[56] References Cited

UNITED STATES PATENTS

| | | | |
|---|---|---|---|
| 3,423,129 | 1/1969 | Benner | 301/6 CS |
| 2,041,457 | 5/1936 | Cautley | 301/6 CS |
| 1,956,739 | 5/1934 | Gollert | 152/153 |
| 3,113,604 | 12/1963 | Connor | 301/6 CS |
| 2,538,563 | 1/1951 | Isham | 152/153 |
| 1,704,002 | 3/1929 | Holmes | 152/330 W |
| 1,038,092 | 9/1912 | Craig | 152/153 |

*Primary Examiner*—Arthur L. La Point
*Assistant Examiner*—P. W. Keen
*Attorney*—Carl A. Hechmer, Jr. and Earl T. Reichert

[57] ABSTRACT

A wheel assembly has an enclosed and evacuated chamber extending between its hub and rim. Within the chamber is a liquid which is propelled toward the outer periphery of the assembly by centrifugal force during rotation thereof. Heat from the tire is ultimately transferred to the liquid to vaporize the same, and consequently cool the tire. Because the chamber is evacuated, the vapor rapidly moves inwardly toward the hub. Ambient air contacting the external surfaces of the assembly condenses the vapor, and centrifugal force propels the condensate toward the outer periphery once again. This process is continuously repeated.

1 Claim, 3 Drawing Figures

INVENTOR.
Luke R. Ocone
BY
ATTORNEY

WHEEL ASSEMBLY WITH TIRE COOLING MEANS

This invention relates to a wheel assembly, but more particularly to a wheel assembly having means for dissipating the heat from a tire mounted on a rim of assembly. The invention is especially applicable to wheel assemblies such as are used on today's high-speed autos and trucks, and in particular to those utilizing tubeless tires. The invention is also readily applicable to wheel assemblies such as are used on today's heavy, high-speed aircraft.

During vehicle operation, heat builds up rapidly in rubber tires, especially in the larger sizes used in trucks and buses, and especially at high speeds. According to a report in RUBBER AGE (Richey, Hobbs, & Stiehler, May, 1956, pages 273–276), the internal temperatures of a 9.00-20, 10-ply truck tire loaded to 2,875 pounds, and inflated to an initial pressure of 65 psi gauge at 100° F., is above 190° F. when run at 50 miles per hour. This heat build-up is undesirable for several reasons. First, the pressure in the tire changes so that it is not always possible to keep it in an optimum range for comfort and safety. Second, the properties of rubber change in an undesirable direction upon heating; the modulus, tensile strength, tear resistance, and cut-growth resistance are lower. Power loss increases when tires are hot and the tires are more susceptible to physical damage. Third, oxidative degradation of the rubber is accelerated at higher temperatures. Thus, it is highly desirable to limit the temperature increase in tires.

It is noted that past efforts to provide satisfactory cooling means for tires have not been entirely satisfactory or practical. These efforts have not been successful for a number of reasons. First of all, when liquids are used as the cooling medium, the means provided to deliver the liquid to and from the area desired to be cooled involves complicated tubing arrangements and/or pumping mechanisms. This increases the likelihood of malfunction due to the complicated arrangements needed. Second, in many cases the fluid cooling medium which absorbs heat from the outer periphery of the wheel assembly and transfers it to a cooler part of the wheel assembly, and ultimately to the ambient atmosphere, does not undergo a phase change, i.e., a change from a liquid to a gas, or the cooling medium both absorbs and surrenders heat in a gaseous state. Utilizing a gas, or liquids which do not boil or vaporize, as the cooling medium, is a very inefficient manner of transferring heat. The heat capacities of gasses are low. Thus, the amount of heat that a given weight of gas can remove from a hot surface is very small, and it is necessary to have a high flow of gas to achieve appreciable heat transfer. For this reason, in most practical gas heating or cooling applications, it is necessary to pump or blow the gas over the heat source or heat sink. The same is true of a liquid cooling medium which does not boil or vaporize when absorbing heat. The heat capacity of such a liquid is low. In vapor heat transfer, i.e., where a liquid is vaporized or boiled, the situation is quite different. The heats of vaporization of most liquids are high compared to the heat capacities of the same materials in the gaseous state. Thus, a given weight of material evaporating or condensing at a surface accepts or gives up a relatively large amount of heat. Third, prior to the present invention, many of the previous arrangements involve tubing arrangements, etc., which are quite fragile, and thus susceptible to damage upon bumping of the tire, such as might occur when hitting a curb, or a rut in the road, or in the case of aircraft, when making a hard landing.

Accordingly, one of the primary objects of the present invention is to provide a wheel assembly having a very efficient means for cooling the tire on the rim.

Another object of the present invention is to provide a wheel assembly which is simple in design and rugged in construction.

Another object of the present invention is to provide a wheel assembly in which a heat transferring medium is permanently sealed within the assembly.

Another object of the present invention is to provide a wheel assembly having means tending to automatically provide dynamic wheel balancing.

Briefly, the present invention seeks to accomplish the above objects by providing a wheel assembly which contains a heat transferring liquid. Wall structure in the form of hollow tubular members, or first and second annular webs, extend between the hub and rim of the wheel assembly to contain the liquid. The wheel assembly is so constructed that during operation of the vehicle on which the assembly is mounted, the heat transferring liquid is propelled toward the outer periphery of the wheel assembly where it absorbs heat from the tire. As stated above, the present invention is especially applicable to wheel assemblies utilizing tubeless tires. The reason for this is because the heat is transferred from the tire to the air within the tire, and ultimately to the heat transferring liquid; there is no inner tube present to act as an insulator. A heat transferring liquid is selected which vaporizes or boils within the temperature range encountered during operation of the wheel assembly. As the heat transferring liquid vaporizes or boils, it rises toward the center of the wheel assembly, where it contacts a portion of the wheel assembly cooled by the ambient atmosphere; the vapor condenses and is returned to the outer periphery of the wheel assembly by centrifugal force. Thus, a continuous flow of vapor and liquid occurs within the wheel assembly, effectively transferring the heat from the outer periphery of the wheel assembly to the more extensive inner, cooler surfaces.

Further objects and advantages of the invention will be apparent from the detailed description below:

Figure 1:
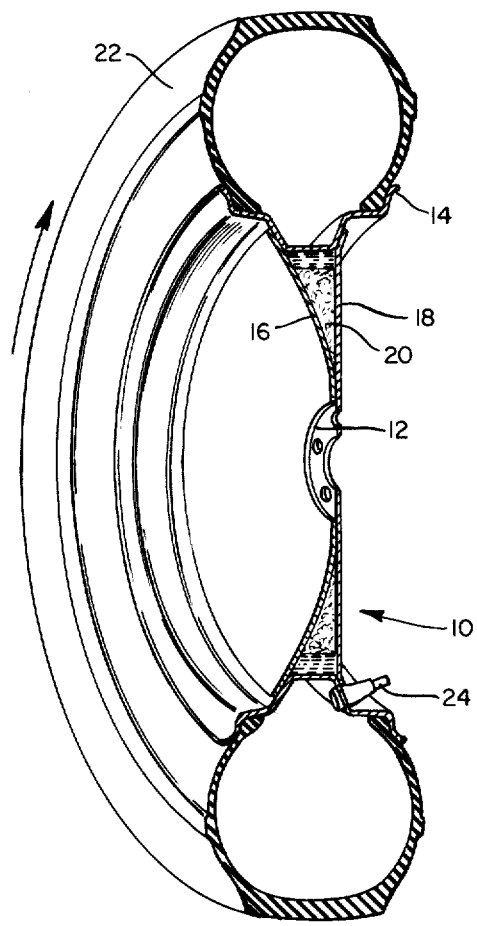
FIG. 1 is a view, partly in section, illustrating a first embodiment of the invention having web structure disposed between a central hub and outer rim of the wheel assembly.

Referring to FIG. 1, it can be seen that a wheel assembly, designated generally by the numeral 10, is comprised of a circular central hub 12, surrounded by an outer circular rim 14. Although shown as circular, it is understood that the outer surface of the hub and the inner surface of the rim in each of the disclosed embodiments may assume other desired forms, e.g., hexagonal. Extending between the hub 12 and the rim 14 is a first annular web 16, and a second annular web 18. As can be seen, this wheel assembly is so constructed that the webs 16 and 18 define with the hub 12 and the rim 14, an enclosed chamber 20. During construction of the wheel assembly, this chamber 20 is evacuated to remove any air, charged or partially filled with a heat transferring liquid, and permanently sealed.

Mounted on rim 14 is a conventional tubeless tire 22. The tire is inflated in the usual manner, i.e., through a valve 24. When the wheel assembly, with tire mounted, is operating, i.e., rotating, the liquid confined within the chamber 20 is propelled by centrifugal force toward the extreme outer end of chamber 20 to contact rim 14. Thus, as can be seen in Fig. 1, the heat transferring liquid is in contact with rim 14 during rotation of the wheel assembly. The heat generated is transferred from the tire to the air contained therein, and ultimately to the rim. The heat transferring liquid is boiled or vaporized by contact with the hot rim, the vapor filling the chamber 20. Because of the rotation of the wheel assembly, and the circulation of the ambient air over webs 16 and 18, the annular external web surfaces are cooler than the rim surface. Thus, vapor within the chamber 20 condenses on the inner surfaces of annular webs 16 and 18, and the heat thus liberated is removed by ambient air. The condensed vapor from the inner surfaces of the webs is then returned to rim 14 by centrifugal force. Thus, it can be seen that the present invention involves a continuous process, i.e., heat is absorbed from the rim by the heat transferring liquid, the liquid is vaporized thereby, the vapor fills chamber 20, and ambient air circulating over the outer surface of the wheel condenses the vapor on the inside surfaces of annular webs 16 and 18; centrifugal force effects the return of the condensate or condensed vapor to the outer portion of the wheel assembly where the process repeats itself.

A distinct advantage of the construction illustrated in FIG. 1 is that it tends to provide automatic dynamic wheel balancing. As can be seen, webs 16 and 18 extend in opposite transverse directions as they extend from hub 12 toward rim 14. This allows the heat transferring liquid within chamber 20 to be distributed over a wide area of rim 14. This not only allows the liquid to more efficiently absorb heat from the rim, but also acts to provide dynamic balance as the wheel assembly is rotating. This dynamic balance is achieved by the free-moving heat transferring liquid distributed along the outer rim 14. For example, if the wheel assembly is out of balance, it will begin to rotate slightly off center, and when this occurs, the liquid contained within chamber 20 within the wheel assembly tends to realign itself and compensate for the off-center position. This principle has been observed in centrifuge bowls used for separating liquids; it has been noted that the centrifuge bowls which contain liquid run more smoothly than empty ones.

Figure 2:
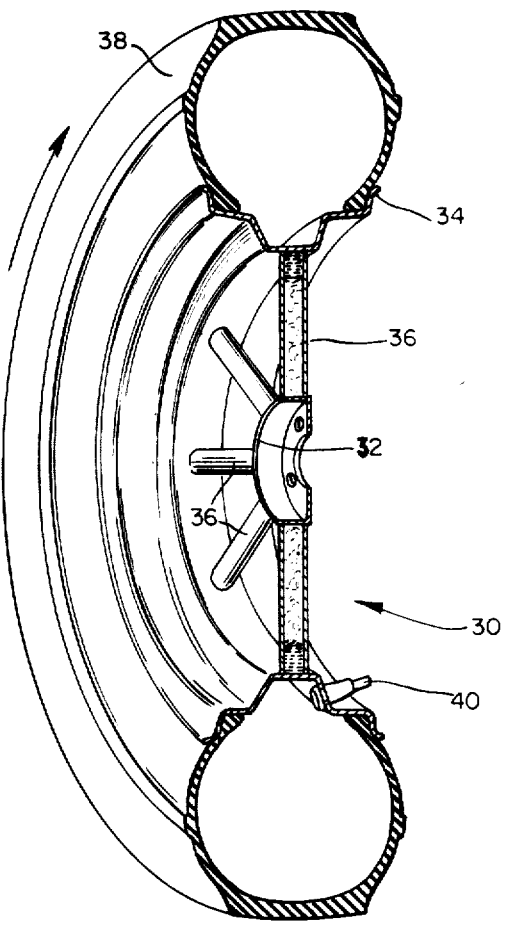
FIG. 2 is a view, partly in section, illustrating a second embodiment of the invention having a plurality of spokes or tubular members disposed between a central hub and outer rim of the wheel assembly.

Referring to FIG. 2, it can be seen that the wheel assembly there illustrated is similar to that illustrated in FIG. 1, except that the web structure of FIG. 1 is replaced with a plurality of spokes, or tubular members 36. Again, a wheel assembly, designated generally by the numeral 30, is shown as comprised of a central circular hub 32 surrounded by an outer rim 34. Extending between the hub and rim is a plurality of hollow spokes or tubular members 36. The chamber within each of hollow spokes or tubular members is also evacuated and partially filled with a heat transferring liquid during construction of the wheel assembly, and then permanently sealed. Mounted on the rim 34 is a hollow, tubeless tire 38 which is inflated through a conventional tire valve 40.

As shown in FIG. 2, during rotation of the wheel, centrifugal force propels the heat transferring liquid to the outer portion of the chamber within the tubular member into contact with the outer rim. The liquid coming into contact with the hot rim is again boiled or vaporized; the vapor fills the chamber within each tubular member, while ambient air passes over the external surfaces of the tubular members and condenses the vapor on the inside surface of each tubular member; centrifugal force returns the condensed vapor to the outer portion of the wheel assembly to repeat the process.

It can be seen that the embodiment of FIG. 2 has the advantage of allowing the ambient air to circulate through the wheel assembly, i.e., between the spokes or tubular members 36, thus providing a very effective cooling means for condensing the vapor contained within the chamber within each tubular member. It can be seen that with the embodiments in FIG. 1 and FIG. 2, the heat is effectively removed from the rim and transferred to the more extensive web and spoke surfaces where it can be removed by ambient air. The cooled rim acts as a heat sink to continuously remove heat from the inside of the tire.

In each of the embodiments illustrated in FIG. 1 and FIG. 2, there are no molecules of gas in the enclosed chamber containing the heat transferring liquid, other than that of the heat transfer liquid itself. Therefore, the flow of vapor from the hot to the cold surface is not impeded. The velocities of the gas molecules are exceedingly high, and a pressure differential is created by temperature differences between the outer hot rim and inner cooler webs or tubular members. As long as a temperature difference exists, there will be evaporation at the hot surface, rapid transfer of vapor to the cold end, and condensation. It is not necessary to pump the gas or vapor, and it is not necessary to pump the liquid, because centrifugal force returns it to the hot rim. Heat transferred by the above mechanism can be several thousand times more efficient than that in the best of metallic conductors. A more comprehensive discussion of the principles of vapor heat transfer can be found in an article on "THE HEAT PIPE" in the May, 1968 issue of The Scientific American (pages 38–46).

Proper choice of a cooling fluid or heat transferring liquid increases the effectiveness or efficiency of the cooling process. Within certain limits, choice of the heat transferring liquid is not critical. It is necessary that a liquid phase be present over the operating temperature range. However, if the fluid is too involatile, i.e., does not vaporize or boil easily, the vapor density will be low and the heat transfer rate will be limited. Using a fluid which vaporizes easily at the temperature to be encountered during operation of the wheel assembly greatly increases the heat transfer rate. Liquids which boil or vaporize at a lower temperature produce higher vapor pressures and vapor densities, and the heat transfer is thereby improved. The lower boiling point limit of the heat transfer liquid will be determined by the ability of the wall structure to withstand the pressure generated. Walls can be thickened or designed to withstand higher pressure, but in heat transfer applications this is self-defeating. A liquid which generates a vapor pressure of 1 to 2 atmospheres in the operating range would be easily contained, i.e., the walls would not have to be unduly thick. Thus, between the extremes of low efficiency at very low vapor pressures, and too high pressures, there is a broad range of fluid volatility in the operable region. Other factors being equal, it is desirable that the heat of evaporation of the liquid be high.

Except for extraordinary conditions, the ambient air will not exceed 110° F. Therefore, the amount of liquid should be chosen so that there will be liquid present at least up to this temperature. A liquid with a normal boiling point of 110° to 120° F. will generate about 1 atmosphere of pressure in the evacuated space within each tubular member or within the web structure at these temperatures. Examples of suitable fluids are the following: Pentane, Methyl Iodide, Cyclopentane. The choice of more volatile fluid is limited only by the ability of the chamber within the wall structure to withstand the pressure. It is possible therefore to choose liquids both more and less volatile than those listed.

Figure 3:
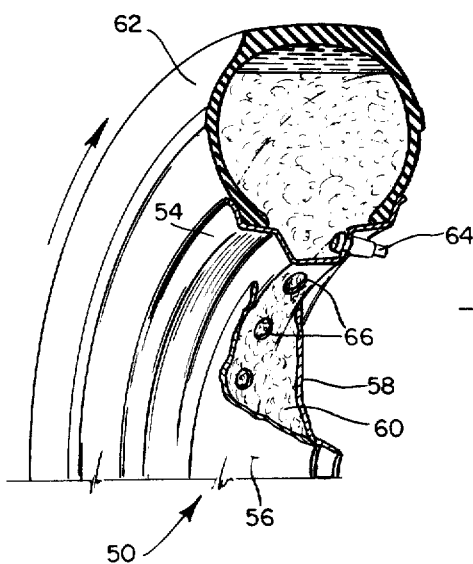
FIG. 3 is a view, partly in section, illustrating a third embodiment of the invention in which the outer rim of the wheel assembly is perforated.

Referring to FIG. 3, it can be seen that an embodiment is illustrated in which the outer rim of the wheel assembly is perforated. This modification is equally applicable to either the spoke type or web type wheel assembly illustrated in FIGS. 1 and 2. As shown, a wheel assembly, designated generally by the numeral 50, has a first annular web 56 and a second annular web 58 extending from the central hub (not shown) to the outer rim 54 of the wheel assembly. This arrangement provides an enclosed chamber 60. Mounted on the rim is a hollow tubeless tire 62 inflated through a conventional valve 64. A plurality of openings 66 are provided in the rim, thereby communicating chamber 60 with the interior of the hollow tubeless tire 62. By designing the wheel assembly in this manner, the heat transferring liquid contained within chamber 60 is propelled by centrifugal force through openings 66, and into the interior of the tubeless tire. The layer of liquid in contact with the interior peripheral surface of the tire 62 is vaporized by contact with the tire, the vapor filling the interior of the tire, and also the chamber 60. Again, ambient air passing over the external surfaces of webs 56 and 58 condenses the vapor on the interior surfaces thereof, and the condensed vapor or liquid is again propelled to the outer periphery of the rotating wheel assembly.

For the particular embodiment illustrated in FIG. 3, a heat transferring liquid must be selected which has a lower vapor pressure at the median working temperature of the system, say 100° F. for a tire. This is because vapor pressures of liquids increase expotentially with temperature. Thus, if a highly volatile fluid is utilized, this causes unacceptably large changes in tire pressure. However, by using a less volatile fluid or heat transferring liquid, this problem is eliminated. Such a liquid will obviously not generate enough pressure to inflate the tire. However, the pressure of the tire is brought up to the required level with the air in the usual manner. The vapor pressure of the liquid still increases expotentially, but the absolute change in pressure is small. The heat transfer rate will be lower than the first two embodiments described because of the relatively low density of the condensable vapor, and the impending effect of a second gas, i.e., air; however the heat transfer rate of such a system is higher than in a system where only a gas such as air is present. Perfluorocarbons might be especially suitable because they have little effect on the properties of rubber.

Although the present invention has been described in connection with a vehicle wheel assembly, and particularly a wheel assembly utilizing a tubeless tire, it is obvious that this system could be used to cool peripheral surfaces of any rotating structure such as gears, drums, etc. Thus, although I have described my invention with a certain degree of particularity, it is understood that the present disclosure has been made only by way of example, and that numerous changes in the details of construction and combination and arrangement of parts may be restored to without departing from the spirit and scope of the invention as hereinafter claimed.

What is claimed is:

1. A wheel assembly comprising a hub, a rim concentrically disposed around said hub, wall structure extending between said hub and rim, said wall structure together with said hub and said rim defining an enclosed chamber, said chamber being sealed to prevent any communication between said chamber and the surrounding atmosphere during the operation of the wheel assembly, said chamber being evacuated of air, a tubeless tire mounted on said rim, and a heat transferring liquid disposed within said evacuated chamber, said liquid adapted to vaporize upon contacting said rim during operation of said wheel assembly, the vapor being adapted to condense upon moving radially inwardly toward said hub and contacting the inner surface of said wall structure during operation of said wheel assembly.

* * * * *